United States Patent
Yu Tseng et al.

(10) Patent No.: US 11,256,847 B2
(45) Date of Patent: Feb. 22, 2022

(54) METHOD AND APPARATUS OF ELECTROMIGRATION CHECK

(71) Applicant: TAIWAN SEMICONDUCTOR MANUFACTURING COMPANY LTD., Hsinchu (TW)

(72) Inventors: Hsien Yu Tseng, Tongxiao Township (TW); Tsun-Yu Yang, Changhua (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 0 days.

(21) Appl. No.: 16/566,603

(22) Filed: Sep. 10, 2019

(65) Prior Publication Data

US 2020/0134132 A1 Apr. 30, 2020

Related U.S. Application Data

(60) Provisional application No. 62/753,291, filed on Oct. 31, 2018.

(51) Int. Cl.
| | |
|---|---|
| *G06F 30/398* | (2020.01) |
| *G06F 30/392* | (2020.01) |
| *G06F 119/10* | (2020.01) |
| *G06F 119/08* | (2020.01) |

(52) U.S. Cl.
CPC .......... *G06F 30/398* (2020.01); *G06F 30/392* (2020.01); *G06F 2119/10* (2020.01)

(58) Field of Classification Search
CPC .. G06F 2119/10; G06F 30/392; G06F 30/398; G06F 119/10; G06F 2119/08; G06F 119/08
See application file for complete search history.

(56) References Cited

U.S. PATENT DOCUMENTS

| | | | |
|---|---|---|---|
| 7,260,442 B2 | 8/2007 | Hwang et al. | |
| 9,256,709 B2 | 2/2016 | Yu et al. | |
| 2008/0086708 A1* | 4/2008 | Rittman | G06F 30/398 716/52 |
| 2013/0055184 A1* | 2/2013 | Shroff | G06F 30/398 716/112 |
| 2014/0040838 A1 | 2/2014 | Liu et al. | |
| 2015/0278429 A1 | 10/2015 | Chang | |
| 2015/0348898 A1* | 12/2015 | Shroff | G06F 30/394 257/773 |
| 2015/0356229 A1* | 12/2015 | Siu | G01R 31/2858 716/115 |
| 2017/0169146 A1* | 6/2017 | Chen | G06F 30/367 |

\* cited by examiner

*Primary Examiner* — Vuthe Siek
(74) *Attorney, Agent, or Firm* — Hauptman Ham, LLP

(57) ABSTRACT

A method includes conducting an electromigration (EM) check process on a schematic design, conducting a mitigating process to mitigate one or more electromigration violations identified during conducting the EM check process, and generating a layout design of the schematic design after at least one iteration of a design process including the EM check process and the mitigating process. The EM check process includes selecting at least some circuits in the schematic design as selected circuits for electromigration check, and checking electromigration compliance in the selected circuits. The mitigating process includes one of modifying some circuit layout of the selected circuits, modifying the schematic design, or modifying both the schematic design and some circuit layout of the selected circuits.

20 Claims, 7 Drawing Sheets

METHOD AND APPARATUS OF ELECTROMIGRATION CHECK

PRIORITY CLAIM

The present application claims the priority of U.S. Provisional Application No. 62/753,291, filed Oct. 31, 2018, which is incorporated herein by reference in its entirety.

BACKGROUND

Current passing through conductive lines induces electromigration (EM), i.e., the movement of the metal atoms resulting from momentum transfer between the electrons passing through the conductive lines and the metal atoms comprising the conductive lines. Over time, EM causes the formation of hillocks (accumulation of excess metal) and/or voids (depletion of initial metal) in the wire which, in turn, tends to result in short circuits (hillocks) or open circuits (voids). EM evaluation, analysis, and signoff methodologies are applied to integrated circuit designs to provide some reasonable and prudent estimates regarding the risk of product failures associated with electromigration.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
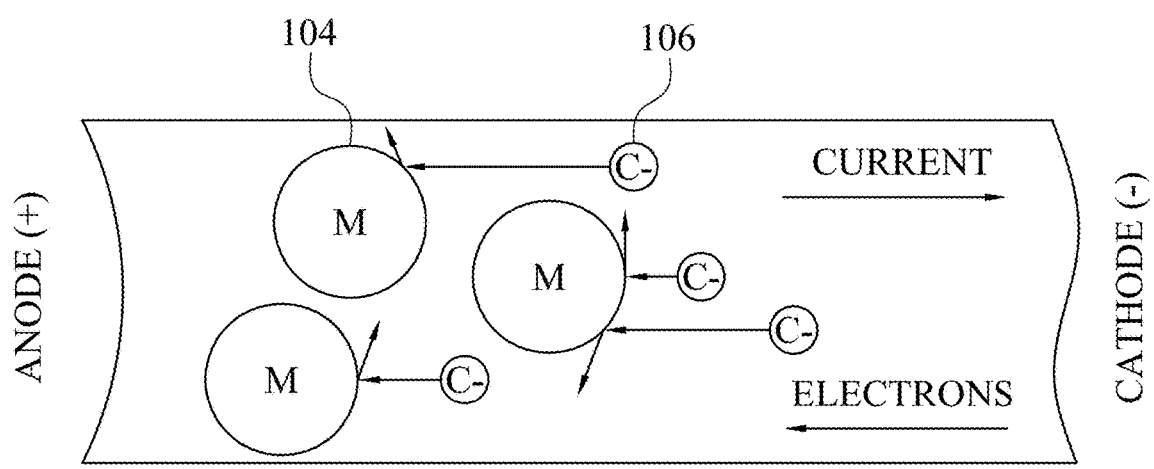
FIG. 1 is a schematic view of a process of electromigration within a metal wire.

The following disclosure provides many different embodiments, or examples, for implementing different features of the provided subject matter. Specific examples of components, materials, values, steps, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Electromigration (EM) occurs when electrical current passes through a conductive line and the electrons transfer a portion of their momentum to the atoms of the conductive line, thereby tending to urge the atoms in the direction of the electron flow. As in FIG. 1, conductive line segment 100 includes a conductive line 102 including a plurality of metal atoms 104, selected from a group of metals including, e.g., aluminum (Al), copper (Cu), titanium (Ti), tantalum (Ta), tungsten (W), platinum (Pt), cobalt (Co) and, in some embodiments, one or more alloys or other elements including nickel (Ni), nitrogen (N), and silicon (Si), that have been patterned to form a conductive path for the electrons 106 moving between a cathode and an anode. The repeated transfer of momentum from the electrons 106 to the metal atoms 104 during operation of the integrated circuit will gradually shift the metal atoms from their original positions, thereby increasing the non-uniformity of the conductive line 102.

Semiconductor devices tend to increase in temperature during use as a result of self-heating effects (SHE). These SHE limit both the performance capability and the operational lifetime of the affected semiconductor devices. For example, self-heating effects in semiconductor devices such as fin field effect transistors (FinFETs) will tend to reduce device performance and reliability. The heating from other active elements, when coupled with inherent current/resistance (IR) heating (also referred to as ohmic or joule heating) of conductive lines, increases the risk of accelerated EM-related failures.

In those regions of the conductive line in which the movement of the metal atoms 104 reduces the cross-section of the conductive line 102, the current density will increase and further exacerbate both the SHE and EM in the thinned region(s). Conductive lines 102 incorporating such thinned regions will exhibit increased resistance and will typically lead to reduced performance and, eventually, a void or an open circuit. Conversely, in those regions of the conductive line 102 in which the movement of the metal atoms 104 increases the cross-section of the conductive line 102, the thickened regions, e.g., hillocks, will tend to stress the surrounding materials and eventually compromise the structural integrity of the surrounding materials and/or create short circuit to an adjacent conductive line or other conductor.

To help reduce or eliminate EM-induced failures, the design rules associated with the manufacturing process include EM rules to limit the average current density through a conductive line and to take into consideration the temperature of the conductive lines during the anticipated operation of the semiconductor device. Integrated circuit designs that pass the applicable EM rules are approved for EM signoff and tape-out.

In some methods of generating the integrated circuit designs, after a schematic design of the integrated circuit passes a pre-Layout circuit simulation, a layout design of the schematic design is generated. The layout design is verified against the schematic design, and checked for design rule compliance. Parameter extraction and a post-layout circuit simulation are conducted on the layout design. Then, the layout design is subjected to a post-layout electromigration check. If the layout design of the schematic design passes the post-layout electromigration check, the layout design is approved for EM signoff and tape-out. If the layout design of the schematic design fails under the post-layout electromigration check, the schematic design and/or the layout design are modified. After such modification, various post-layout processes are again performed on the layout design. When the schematic design of the integrated circuit involves a large number of electronic components, the various post-layout processes for verification, rule check, and simulation can be time consuming. As the number of electronic components in the schematic design of the integrated circuit increases, the time spent to perform various post-layout processes for verification, rule check, and simulation increases. Consequently, each iteration of going through both the layout modification and the post-layout electromigration check is a time consuming procedure. Reducing the time required for generating layout designs that meet the electromigration compliance requirement improves throughput of the schematic design generation process.

Figure 2:
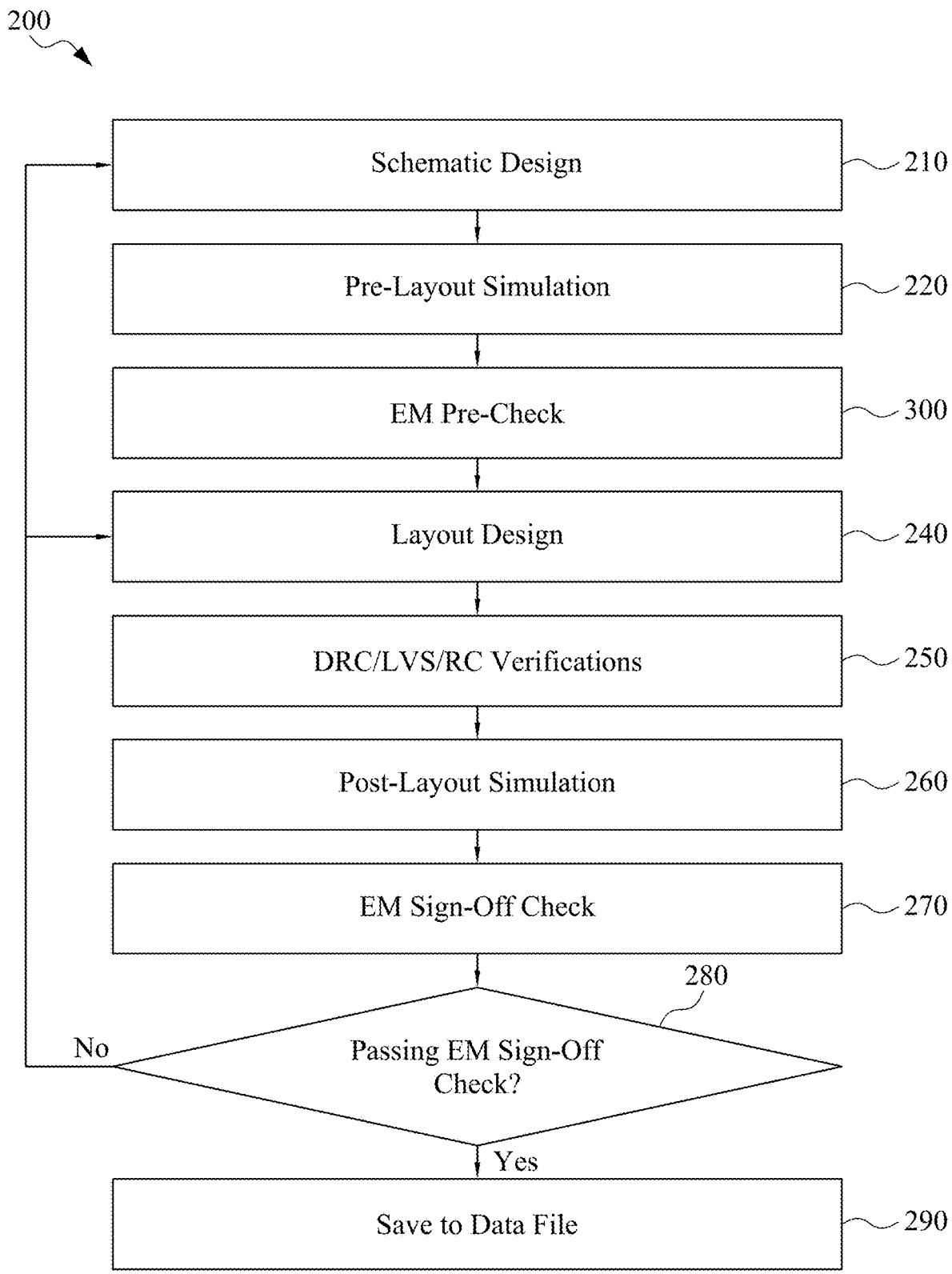
FIG. 2 is a flowchart of a process of generating a layout design of an integrated circuit, in accordance with some embodiments.

FIG. 2 is a flowchart of a process 200 of generating a layout design of an integrated circuit, in accordance with some embodiments. In the process 200, a schematic design of the integrated circuit is generated (at block 210), and a pre-layout circuit simulation is conducted on circuits in the schematic design (at block 220). In some embodiments, during the pre-layout circuit simulation, the user runs a SPICE simulation with SPICE models provided by a foundry service provider. With the SPICE simulation, the device current waveform and the device SHE temperature are able to be obtained from the simulation output.

In FIG. 2, after the pre-layout circuit simulation (at block 220), the schematic design is subjected to an electromigration (EM) check process (at block 300). After the schematic design passes the EM check process, a layout design according to the schematic design is generated (at block 240). The layout design is verified against the schematic design and checked for design rule compliance (at block 250). Various parameters are extracted from the layout design (at block 250). Next, a post-layout circuit simulation is conducted (at block 260) on circuits according to the layout design according to the schematic design. Then, a post-layout electromigration check is conducted (at block 270) on the layout design of the schematic design. If the layout design according to the schematic design passes the post-layout electromigration check, the layout design is presented or saved in one or more data files. If the layout design according to the schematic design fails under the post-layout electromigration check, the process 200 returns to block 210 in which the schematic design is modified or returns to block 240 in which the layout design according to the schematic design is modified.

Figure 3:
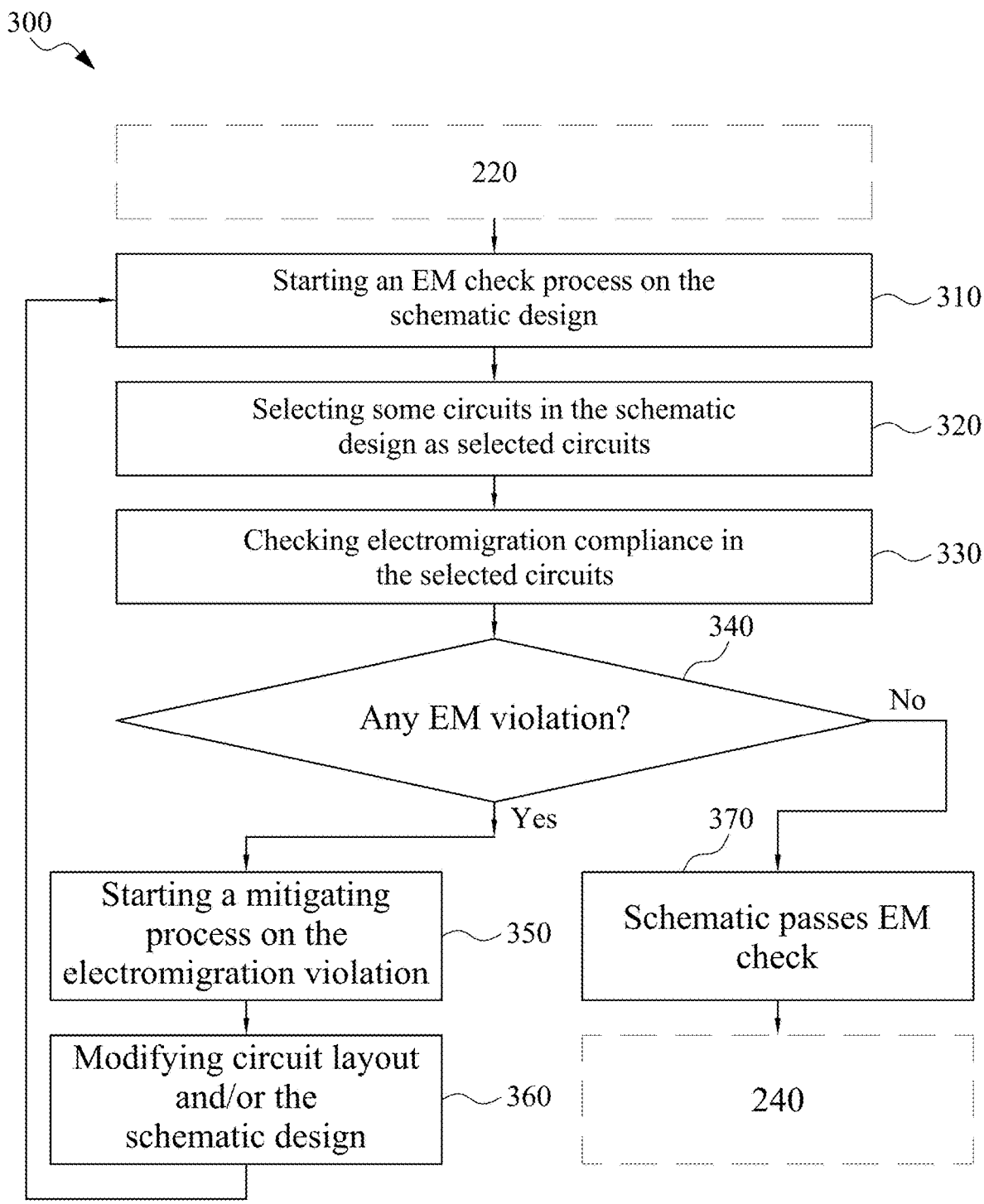
FIG. 3 is a flowchart of the electromigration check process conducted before the layout design process, in accordance with some embodiments.

FIG. 3 is a flowchart of the electromigration (EM) check process 300 conducted before the layout design process (at block 240 in FIG. 2), in accordance with some embodiments. In FIG. 3, after starting the electromigration (EM) check process (at block 310), at least some circuits in the schematic design are selected as selected circuits (at block 320). In some embodiments, all circuits in the schematic design are selected as the selected circuits. In some embodiments, only circuits in a portion of the schematic design are selected as the selected circuits. The selected circuits are checked for electromigration compliance (at block 330). If an electromigration violation is identified during the process to check for electromigration compliance (at block 330), the electromigration violation is evaluated (at block 340) for determining whether such electromigration violation needs to be mitigated. If no electromigration violation needs to be mitigated, the schematic design passes the EM check process (at block 370), and the layout design according to the schematic design is generated (e.g., at block 340 in FIG. 2). On the other hand, if one or more electromigration violations identified during the electromigration compliance checking process (at block 340) need to be mitigated, a mitigating process is started (at block 350) to mitigate the one or more electromigration violations.

During the mitigating process at block 360, the schematic design or a circuit layout can be modified. For some types of electromigration violations, the schematic design is modified without modifying the layout of the selected circuits. For some types of electromigration violations, the layout of some parts of the selected circuits is modified while the schematic design remains unchanged. For some types of electromigration violations, in addition to a modification of the schematic design, the layout of some parts of the selected circuits is also modified. For reducing EM effects, in some embodiments, routings in the layout are changed. In some embodiments, the routing change includes changing a routing direction relative to the direction of the stress gradient. In some embodiments, the routing change includes moving a conductive connection from a lower metal layer (e.g., M1 layer) to a higher metal layer (e.g., M3 layer). In some embodiments, the routing change includes changing the number of vias at locations having high stress gradient. For reducing EM effects, in some embodiments, conductor shapes are changed to reduce IR drop. In some embodiments, the layout shape and/or the schematic parameters in the schematic are modified manually in a corresponding layout editor tool or schematic editor tool. In some embodiments, the layout shape and/or the schematic parameters in the schematic are modified automatically in a corresponding EM-aware layout editor tool or EM-aware schematic editor tool. In some embodiments, the layout shape and/or the schematic parameters in the schematic are corrected automatically in a storage database.

Figure 4:
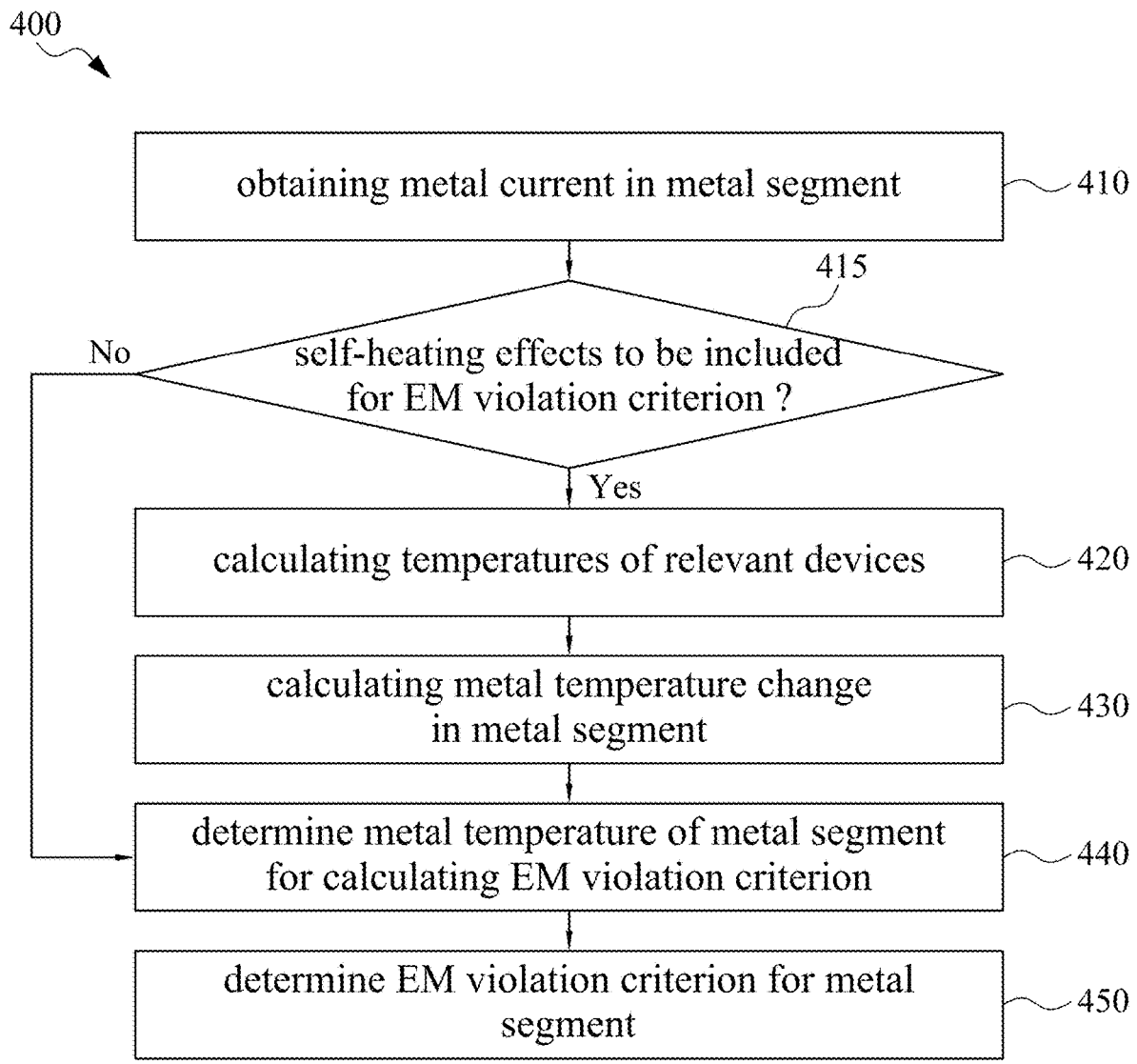
FIG. 4 is a flowchart of a process of determining the EM violation criterion for a metal segment under inquiry, in accordance with some embodiments.

After the one or more electromigration violations are mitigated (at block 360), the process goes back to block 310 to continue another iteration (from block 310 to block 360) including at least the EM check process (at block 330 and block 340) and the mitigating process (at block 360) if one or more electromigration violations are again identified. In some embodiments, the iteration (from block 310 to block 360) including the EM check process and the mitigating process continues multiple times until the schematic design passes the EM check process (at block 370). The iteration of the processes (from block 310 to block 360) in FIG. 4 is less time consuming than the iteration of the processes (from block 210 to block 280) in FIG. 2. In FIG. 2, because some electromigration violations are identified and mitigated during the EM check process 300 that is conducted before the layout design process (at block 240), the total number of incidents of the electromigration violations identified during the post-layout process of EM sign-off check (at block 270) is reduced. A smaller number of electromigration violations may result in a smaller number of the iterations (from block 280 to either block 210 or block 240) including the post-layout verification, simulation, and EM sign-off check processes. Consequently, in FIG. 2, by including the EM pre-check process (at block 300) before the layout design process (at block 240), the overall time required for a layout design may be reduced.

In FIG. 3, during the checking for electromigration compliance of the selected circuits (at block 330), in some embodiments, one or more electromigration violations are identified based upon EM violation criteria that depend upon multiple factors, such as, layout geometries, device temperatures, metal temperatures, and/or metal currents. Metal layout geometries, via geometries, and geometries for active device modeling are some of the example layout geometries that influences to the EM violation criteria for determining electromigration violations. In some embodiments, the layout geometries of some or all the selected circuits are found from corresponding parameterized cells. In some embodiments, when the layout geometries of some selected circuits are not found from corresponding parameterized cells, at least some layout geometries are found from other information sources. For example, in some embodiments, the layout geometries of some or all of the selected circuits are found or estimated from one or more layout constraint files.

In FIG. 3, during the checking for electromigration compliance of the selected circuits (at block 330), in some embodiments, the device temperatures, the metal temperatures, and the metal currents for determining the EM violation criteria are obtained from circuit simulation of the selected circuits in the schematic design. In some embodiments, the circuit simulation of the selected circuits are obtained from the simulation results of the pre-layout circuit simulation process (at block 220 in FIG. 2). In some embodiments, when the simulation results of the pre-layout circuit simulation process (at block 220 in FIG. 2) are saved and later used to obtain the device temperatures, the metal temperatures, and the metal currents for determining the EM violation criteria, the overall time consumed during the process of checking for electromigration compliance (at block 330) may be reduced. In some other embodiments, the circuit simulation for determining the device temperatures and the metal temperatures/currents is conducted during the process of checking for electromigration compliance (at block 330), after at least some circuits in the schematic design are selected as the selected circuits (at block 320).

In FIG. 3, during the checking for electromigration compliance of the selected circuits (at block 330), in some embodiments, one or more electromigration violations in metal segments in the selected circuits are identified based upon the EM violation criteria for the metal segments. In some embodiments, different EM violation criteria are used for different metal segments. In some embodiments, the EM violation criteria for two closely positioned metal segments in a same metal layer can be implemented with similar mathematical functions. In some embodiments, all metal segments in the selected circuits are selected as metal segments under inquiry and checked for electromigration compliance. In some embodiments, the metal segments in the selected circuits are classified into groups, and some groups of the metal segments are selected as metal segments under inquiry and checked for electromigration compliance.

In some embodiments, the EM violation criterion for a metal segment under inquiry in the selected circuits depends upon multiple factors including the metal temperature of the metal segment under inquiry and the layout geometries of the metal segment under inquiry. In some embodiments, for determining the EM violation criterion for a metal segment under inquiry, the metal temperature of the metal segment under inquiry is selected to be equal to an environment temperature. Alternatively, in some embodiments, for determining the EM violation criterion for a metal segment under inquiry, the metal temperature of the metal segment under inquiry is selected to be equal to a sum of an environment temperature and the metal temperature change in the metal segment under inquiry. In some embodiments, the metal temperature change in the metal segment under inquiry depends upon multiple factors including one or more of the following: the current in the metal segment under inquiry, the temperature changes of the devices that have thermal contact with the metal segment under inquiry, and the thermal couplings between the metal segment under inquiry and the devices having the temperature changes.

FIG. 4 is a flowchart of a process 400 of determining the EM violation criterion for a metal segment under inquiry, in accordance with some embodiments. In the process 400 of FIG. 4, the current in a metal segment under inquiry is obtained (at block 410) from circuit simulation. In some embodiments, the current in a metal segment under inquiry depends upon the device current in one or more relevant devices connecting to the metal segment under inquiry. In some embodiments, the device current in a connected device is obtained from the simulation results of the pre-layout circuit simulation process (at block 220 in FIG. 2). In some embodiments, the device current in a connected device is obtained from the circuit simulation conducted during the checking for electromigration compliance (at block 330 in FIG. 3). In some embodiments, when the metal segment under inquiry is one of several metal fingers for distributing the device current, the current in the metal segment under inquiry depends upon both the device current and the number of metal fingers for distributing the device current. For example, metal current=f (Device current, metal finger number, . . . ). In some embodiments, the number of metal fingers is obtained from the corresponding parameterized cell or from the corresponding layout constraint file. In some embodiments, the current in a metal segment under inquiry depends upon the via current in one or more relevant vias connecting to the metal segment under inquiry. When the metal segment under inquiry is connected to several relevant vias for distributing a device current, the current in the metal segment under inquiry depends upon both the device current and the number of relevant vias for distributing the device current. For example, the via current=f (Device current, via number, . . . ). In some embodiments, the number of relevant vias is obtained from the corresponding parameterized cell or from the corresponding layout constraint file.

In FIG. 4, it is determined (at block 415) whether the temperature change due to self-heating effects needs to be considered in the EM violation criterion. If it is determined (at block 415) that the temperature change due to self-heating effects does not need to be considered, the process 400 directly proceeds to operation 440 from operation 415, and the metal temperature of the metal segment under inquiry for calculating the EM violation criterion is selected to be the environment temperature $T_{env}$, that is, $T_{metal}$. Alternatively, if it is determined (at block 415) that the temperature change due to self-heating effects needs to be considered, the process 400 continues to operation 420.

Figure 5:
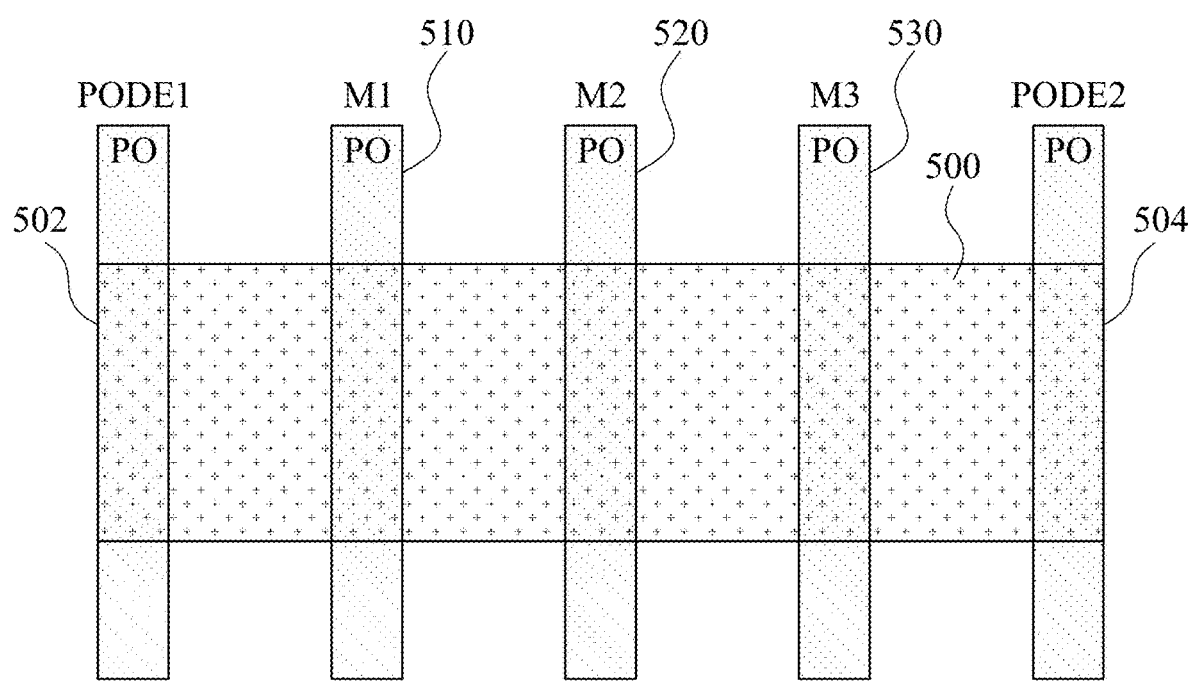
FIG. 5 is a schematic diagram of an active zone including transistors having self-heating effects, in accordance with some embodiments.

In FIG. 4, at operation 420, the temperature changes of relevant devices that have non-negligible thermal couplings to the metal segment under inquiry are calculated. In one example, some of the relevant devices include active devices in an active zone 500 of FIG. 5, such as, the three transistors (e.g., M1, M2, and M3) in the active zone 500 between two edges (e.g., 502 and 504). In FIG. 5, the gates of the three transistors (e.g., M1, M2, and M3) are formed over corresponding channel regions in the active zone 500 when three conductive segments (e.g., 510, 520, and 530) intersect the active zone 500 over the channel regions. In some embodiments, each of the three conductive segments (e.g., 510, 520, and 530) is characterized as a poly-line PO in layout diagrams. In some embodiments, each of the two edges (e.g., 502 and 504) of the active zone 500 is corresponding to one of the two conductive lines PODE1 and PODE2.

In some embodiments, the active zone 500 includes one or more fin structures which are parallel to each other. When the three conductive segments (e.g., 510, 520, and 530) intersect with the one or more fin structures located within the active zone 500, three FinFET transistors (e.g., M1, M2, and M3) are formed. The self-heating effects of the FinFET transistors generally raise the local temperatures near the FinFET transistors. In some embodiments, because the thermal path through the substrate is constrained by the poor thermal conductivity of the dielectric at the base of the one or more fin structures, a significant percentage of the self-heat energy generated by the FinFET transistors flows vertically and laterally to overlying metal layers. The self-heat energy generated by the FinFET transistors may raise the temperatures of metal segments in various metal layers.

In some embodiments, the temperature change $\Delta T_{OD}$ of the active zone 500 is calculated based upon mathematical relationships that include the thermal influences by the temperature changes of the relevant devices in the active zone 500. For example, in FIG. 5, the temperature change $\Delta T_{OD}$ of the active zone 500 is influenced by the temperature changes of the FinFET transistors (e.g., M1, M2, and M3) and the PODE devices formed with conductive lines PODE1 and PODE2 at the edges 502 and 504. The temperature changes of the FinFET transistors M1, M2, and M3 are correspondingly represented by temperature changes $\Delta T_{M1}$, $\Delta T_{M2}$, and $\Delta T_{M3}$. The temperature changes of the PODE devices formed with conductive lines PODE1 and PODE2 are correspondingly represented by temperature changes $\Delta T_{PODE1}$ and $\Delta T_{PODE2}$. The temperature change $\Delta T_{OD}$ of the active zone 500 is a function of the temperature changes $\Delta T_{M1}$, $\Delta T_{M2}$, $\Delta T_{M3}$, $\Delta T_{PODE1}$, and $\Delta T_{PODE2}$. In some embodiments, $\Delta T_{OD}$=f ($\Delta T_{PODE1}$, $\Delta T_{M1}$, $\Delta T_{M2}$, $\Delta T_{M3}$, $\Delta T_{PODE2}$).

In some embodiments, each of the temperature changes $\Delta T_{M1}$, $\Delta T_{M2}$, $\Delta T_{M3}$, $\Delta T_{PODE1}$ and $\Delta T_{PODE2}$ is calculated based on a corresponding device temperature equation that is embedded in a device model used in circuit simulation. In some embodiments, the device temperature equation for calculating the temperature change of a device (e.g., M1, M2, or M3) includes multiple factors that have influences to the temperature change. The multiple factors include the thermal resistance value $R_{THC}$, the number of fins in the device $N_{fin}$, the number of fingers in the device $N_{fingers}$, and power disputation per finger $P_{fin}$. For example, in some embodiments, the temperature change $\Delta T_{M1}$ of the FinFET transistors M1 is expressed as a function of its thermal resistance value $R_{THC\_M1}$, the number of fins in the device $N_{fin\_M1}$, the number of fingers in the device $N_{fingers\_M1}$, and power disputation per finger $P_{fin\_M1}$. In some embodiments, $\Delta T_{M1}$=f ($R_{THC\_M1}$, $N_{fin\_M1}$, $N_{fingers\_M1}$, $P_{fin\_M1}$). In some embodiments, the device temperature equation for calculating the temperature change of a device is provided as part of the design tools provided by a semiconductor device foundry. One example of the design tools is a Simulation Program with Integrated Circuit Emphasis (SPICE). The device temperature equation is used in device models corresponding to a particular manufacturing process.

In FIG. 4, after the temperature changes of the relevant devices are calculated (at block 420), the temperature change in the metal segment under inquiry is calculated (at block 430). In some embodiments, the calculation of the temperature change in the metal segment under inquiry includes calculating the temperature change $\Delta T_{rms}$ due to the metal joule heating induced by the current in the metal segment and calculating the temperature change due to self-heating of relevant devices, such as FinFET devices. In some embodiments, for calculating the temperature change $\Delta T_{rms}$ due to the metal joule heating, the current in the metal segment under inquiry is obtained in operation 410 of FIG. 4, the physical dimensions of the metal segment under inquiry are obtained from the layout geometries of the metal segment, and the resistivity of the metal segment is obtained from device models or from additional information source (e.g. a file or a database). In some embodiments, the equation for calculating the metal joule heating in the metal segment under inquiry is provided by a foundry service provider. In some embodiments, the calculation of the temperature change due to self-heating of the relevant devices includes calculating the temperature change $\Delta T_{OD}$ of the active zone 500 in FIG. 5.

In some embodiments, at operation 430, a SHE thermal model is used to estimate the thermal influence to the metal segment under inquiry by the metal joule heating and to estimate the thermal couplings to the metal segment under inquiry from the self-heating of other relevant devices. In some embodiments, as a specific example, the temperature change $\Delta T_{metal}$ in the metal segment under inquiry depends upon at least the temperature change $\Delta T_{rms}$ due to the metal joule heating induced by the current in the metal segment and the temperature change $\Delta T_{OD}$ of the active zone 500 near the metal segment under inquiry. For example, in some embodiments, the temperature change $\Delta T_{metal}$ in the metal segment under inquiry is obtained from equation $\Delta T_{meta}$=f (a, b, $\Delta T_{rms}$, $\Delta T_{OD}$, . . . ), where coefficient "a" and "b" are obtained from the SHE thermal model used at operation 430. The coefficient "a" and "b" characterize the thermal influence to the metal segment under inquiry by the metal joule heating and by the thermal couplings to the metal segment under inquiry from the self-heating of other relevant devices. The coefficient "a" depends upon thermal proximity between the metal segment under inquiry and the active zone 500. When multiple metal layers are stacked upon the fin structures in the active zone 500, an upper metal layer are generally separated from a lower metal layer by several other metal layers and several layers of interlayer dielectric. The value of the coefficient "a" for the upper metal layer can be significantly different from the coefficient "a" for the lower metal layer.

In FIG. 4, at operation 440, the metal temperature of the metal segment under inquiry for calculating the EM violation criterion is determined. In some embodiments, when the EM violation criterion does not need to include the thermal influence of self-heating effects, as decided in operation 415, the metal temperature of the metal segment under inquiry is selected to be equal to the environment temperature, that is, $T_{metal}$=$T_{env}$. In some embodiments, when the EM violation criterion needs to include the thermal influence of self-heating effects, as decided in operation 415, the metal temperature of the metal segment under inquiry is selected to be equal to a sum of the environment temperature $T_{env}$ and the metal temperature change $\Delta T_{metal}$ in the metal segment under inquiry as calculated in operation 430, that is, $T_{metal}=T_{env}+\Delta T_{metal}$.

In some embodiments, the temperature change $\Delta T_{metal}$ in the metal segment under inquiry depends upon the temperature change $\Delta T_{rms}$ due to the metal joule heating in the metal segment and the temperature changes of multiple self-heating relevant devices. The active zone 500 near the metal segment under inquiry is only one of the multiple self-heating relevant devices. Depending upon the SHE thermal model used, the multiple self-heating relevant devices that have thermal influence to the metal segment under inquiry can include one or more resistive heating elements such as resistors, additional FETs, and/or additional active zones.

In FIG. 4, after the metal temperature of the metal segment under inquiry is determined (at block 440), the EM violation criterion for the metal segment under inquiry is determined (at block 450). In some embodiments, the EM violation criterion includes comparing an estimated average current of the metal segment with another current limit, such as a maximum allowed average current corresponding to an acceptable level of EM failure risk. If the estimated average current exceeds the maximum allowed average current, the metal segment under inquiry is deemed to be an incident of EM violation.

In some embodiments, the EM violation criterion includes comparing an estimated mean time to failure (MTTF) of the metal segment caused by EM with another MTTF limit, such as, a minimal required MTTF. If the estimated MTTF does not exceed the minimal required MTTF, the metal segment under inquiry is deemed to be an incident of EM violation. In some embodiments, the EM violation criterion depend upon a number of operative factors including, for example, the metal temperature of the metal segment, the geometries of the metal segment, the composition of the metal segment, the microstructure of the metal segment, the current density carried by the metal segment, and/or the duty cycles over which the current is applied to the metal segment.

In some embodiments, the processes 200, 300, and 400 (correspondingly in FIG. 2, FIG. 3, and FIG. 4) are implemented as computer program code. The computer program code is stored on a non-transitory computer-readable medium. In some embodiments, the processes 200, 300, and 400 are conducted by one or more processors in a system following the instructions provided by the computer program code. In some embodiments, the system for generating a layout diagram of an integrated circuit includes at least one processor and at least one memory including the computer program code for one or more programs. In some embodiments, the at least one memory, the computer program code and the at least one processor are configured to cause the processes 200, 300, and 400 be conducted in the system following the instructions provided by the computer program code.

Figure 6:
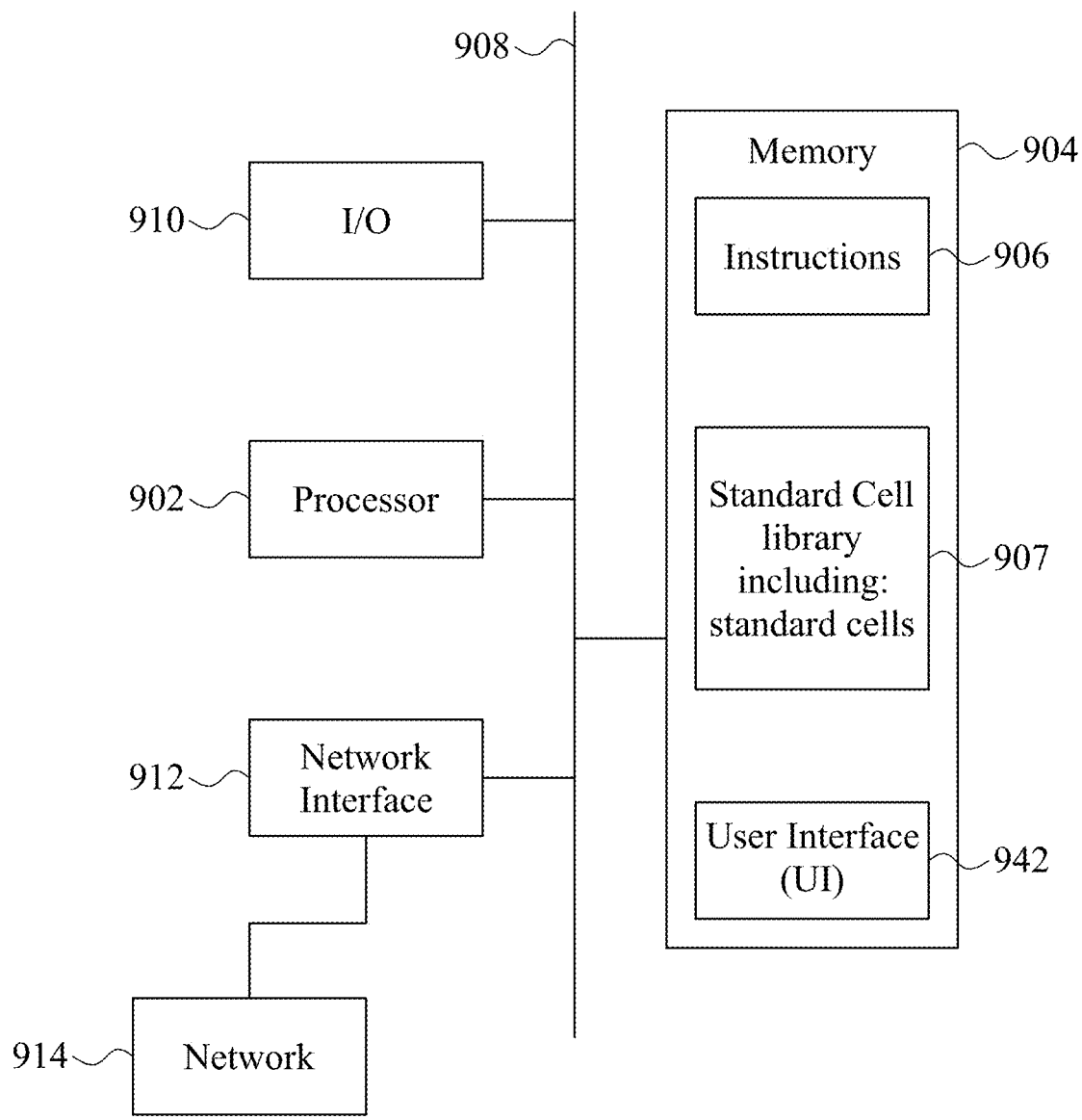
FIG. 6 is a block diagram of an electronic design automation (EDA) system, in accordance with some embodiments.

FIG. 6 is a block diagram of an electronic design automation (EDA) system 900 in accordance with some embodiments. In some embodiments, EDA system 900 includes an APR system. Methods described herein of designing layout diagrams represent wire routing arrangements, in accordance with one or more embodiments, are implementable, for example, using EDA system 900, in accordance with some embodiments.

In some embodiments, EDA system 900 is a general purpose computing device including a hardware processor 902 and a non-transitory, computer-readable storage medium 904. Storage medium 904, amongst other things, is encoded with, i.e., stores, computer program code 906, i.e., a set of executable instructions. Execution of instructions 906 by hardware processor 902 represents (at least in part) an EDA tool which implements a portion or all of the methods described herein in accordance with one or more embodiments (hereinafter, the noted processes and/or methods).

Processor 902 is electrically coupled to computer-readable storage medium 904 via a bus 908. Processor 902 is also electrically coupled to an I/O interface 910 by bus 908. A network interface 912 is also electrically connected to processor 902 via bus 908. Network interface 912 is connected to a network 914, so that processor 902 and computer-readable storage medium 904 are capable of connecting to external elements via network 914. Processor 902 is configured to execute computer program code 906 encoded in computer-readable storage medium 904 in order to cause system 900 to be usable for performing a portion or all of the noted processes and/or methods. In one or more embodiments, processor 902 is a central processing unit (CPU), a multi-processor, a distributed processing system, an application specific integrated circuit (ASIC), and/or a suitable processing unit.

In one or more embodiments, computer-readable storage medium 904 is an electronic, magnetic, optical, electromagnetic, infrared, and/or a semiconductor system (or apparatus or device). For example, computer-readable storage medium 904 includes a semiconductor or solid-state memory, a magnetic tape, a removable computer diskette, a random access memory (RAM), a read-only memory (ROM), a rigid magnetic disk, and/or an optical disk. In one or more embodiments using optical disks, computer-readable storage medium 904 includes a compact disk-read only memory (CD-ROM), a compact disk-read/write (CD-R/W), and/or a digital video disc (DVD).

In one or more embodiments, storage medium 904 stores computer program code 906 configured to cause system 900 (where such execution represents (at least in part) the EDA tool) to be usable for performing a portion or all of the noted processes and/or methods. In one or more embodiments, storage medium 904 also stores information which facilitates performing a portion or all of the noted processes and/or methods. In one or more embodiments, storage medium 904 stores library 907 of standard cells including such standard cells as disclosed herein.

EDA system 900 includes I/O interface 910. I/O interface 910 is coupled to external circuitry. In one or more embodiments, I/O interface 910 includes a keyboard, keypad, mouse, trackball, trackpad, touchscreen, and/or cursor direction keys for communicating information and commands to processor 902.

EDA system 900 also includes network interface 912 coupled to processor 902. Network interface 912 allows system 900 to communicate with network 914, to which one or more other computer systems are connected. Network interface 912 includes wireless network interfaces such as BLUETOOTH, WIFI, WIMAX, GPRS, or WCDMA; or wired network interfaces such as ETHERNET, USB, or IEEE-1364. In one or more embodiments, a portion or all of noted processes and/or methods, is implemented in two or more systems 900.

System 900 is configured to receive information through I/O interface 910. The information received through I/O interface 910 includes one or more of instructions, data, design rules, libraries of standard cells, and/or other parameters for processing by processor 902. The information is transferred to processor 902 via bus 908. EDA system 900 is configured to receive information related to a UI through I/O interface 910. The information is stored in computer-readable medium 904 as user interface (UI) 942.

In some embodiments, a portion or all of the noted processes and/or methods is implemented as a standalone software application for execution by a processor. In some embodiments, a portion or all of the noted processes and/or methods is implemented as a software application that is a part of an additional software application. In some embodiments, a portion or all of the noted processes and/or methods is implemented as a plug-in to a software application. In some embodiments, at least one of the noted processes and/or methods is implemented as a software application that is a portion of an EDA tool. In some embodiments, a portion or all of the noted processes and/or methods is implemented as a software application that is used by EDA system 900. In some embodiments, a layout diagram which includes standard cells is generated using a tool such as VIRTUOSO® available from CADENCE DESIGN SYSTEMS, Inc., or another suitable layout generating tool.

In some embodiments, the processes are realized as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

Figure 7:
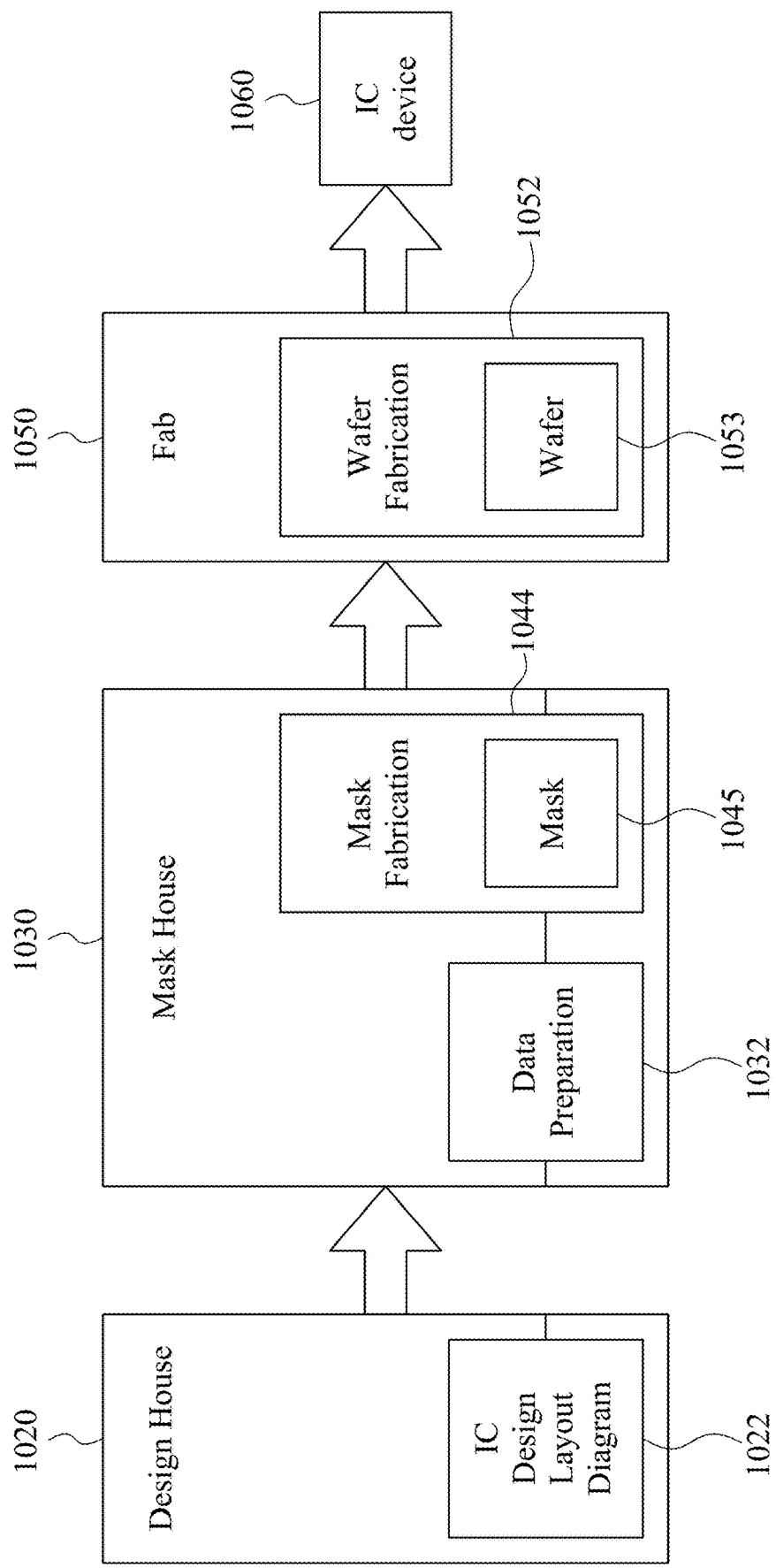
FIG. 7 is a block diagram of an integrated circuit (IC) manufacturing system, and an IC manufacturing flow associated therewith, in accordance with some embodiments.

FIG. 7 is a block diagram of an integrated circuit (IC) manufacturing system 1000, and an IC manufacturing flow associated therewith, in accordance with some embodiments. In some embodiments, based on a layout diagram, at least one of (A) one or more semiconductor masks or (B) at least one component in a layer of a semiconductor integrated circuit is fabricated using manufacturing system 1000.

In FIG. 7, IC manufacturing system 1000 includes entities, such as a design house 1020, a mask house 1030, and an IC manufacturer/fabricator ("fab") 1050, that interact with one another in the design, development, and manufacturing cycles and/or services related to manufacturing an IC device 1060. The entities in system 1000 are connected by a communications network. In some embodiments, the communications network is a single network. In some embodiments, the communications network is a variety of different networks, such as an intranet and the Internet. The communications network includes wired and/or wireless communication channels. Each entity interacts with one or more of the other entities and provides services to and/or receives services from one or more of the other entities. In some embodiments, two or more of design house 1020, mask house 1030, and IC fab 1050 is owned by a single larger company. In some embodiments, two or more of design house 1020, mask house 1030, and IC fab 1050 coexist in a common facility and use common resources.

Design house (or design team) 1020 generates an IC design layout diagram 1022. IC design layout diagram 1022 includes various geometrical patterns designed for an IC device 1060. The geometrical patterns correspond to patterns of metal, oxide, or semiconductor layers that make up the various components of IC device 1060 to be fabricated. The various layers combine to form various IC features. For example, a portion of IC design layout diagram 1022 includes various IC features, such as an active region, gate electrode, source and drain, metal lines or vias of an interlayer interconnection, and openings for bonding pads, to be formed in a semiconductor substrate (such as a silicon wafer) and various material layers disposed on the semiconductor substrate. Design house 1020 implements a proper design procedure to form IC design layout diagram 1022. The design procedure includes one or more of logic design, physical design or place and route. IC design layout diagram 1022 is presented in one or more data files having information of the geometrical patterns. For example, IC design layout diagram 1022 can be expressed in a GDSII file format or DFII file format.

Mask house 1030 includes data preparation 1032 and mask fabrication 1044. Mask house 1030 uses IC design layout diagram 1022 to manufacture one or more masks 1045 to be used for fabricating the various layers of IC device 1060 according to IC design layout diagram 1022. Mask house 1030 performs mask data preparation 1032, where IC design layout diagram 1022 is translated into a representative data file ("RDF"). Mask data preparation 1032 provides the RDF to mask fabrication 1044. Mask fabrication 1044 includes a mask writer. A mask writer converts the RDF to an image on a substrate, such as a mask (reticle) 1045 or a semiconductor wafer 1053. The design layout diagram 1022 is manipulated by mask data preparation 1032 to comply with particular characteristics of the mask writer and/or requirements of IC fab 1050. In FIG. 7, mask data preparation 1032 and mask fabrication 1044 are illustrated as separate elements. In some embodiments, mask data preparation 1032 and mask fabrication 1044 can be collectively referred to as mask data preparation.

In some embodiments, mask data preparation 1032 includes optical proximity correction (OPC) which uses lithography enhancement techniques to compensate for image errors, such as those that can arise from diffraction, interference, other process effects and the like. OPC adjusts IC design layout diagram 1022. In some embodiments, mask data preparation 1032 includes further resolution enhancement techniques (RET), such as off-axis illumination, sub-resolution assist features, phase-shifting masks, other suitable techniques, and the like or combinations thereof. In some embodiments, inverse lithography technology (ILT) is also used, which treats OPC as an inverse imaging problem.

In some embodiments, mask data preparation 1032 includes a mask rule checker (MRC) that checks the IC design layout diagram 1022 that has undergone processes in OPC with a set of mask creation rules which contain certain geometric and/or connectivity restrictions to ensure sufficient margins, to account for variability in semiconductor manufacturing processes, and the like. In some embodiments, the MRC modifies the IC design layout diagram 1022 to compensate for limitations during mask fabrication 1044, which may undo part of the modifications performed by OPC in order to meet mask creation rules.

In some embodiments, mask data preparation 1032 includes lithography process checking (LPC) that simulates processing that will be implemented by IC fab 1050 to fabricate IC device 1060. LPC simulates this processing based on IC design layout diagram 1022 to create a simulated manufactured device, such as IC device 1060. The processing parameters in LPC simulation can include parameters associated with various processes of the IC manufacturing cycle, parameters associated with tools used for manufacturing the IC, and/or other aspects of the manufacturing process. LPC takes into account various factors, such as aerial image contrast, depth of focus ("DOF"), mask error enhancement factor ("MEEF"), other suitable factors, and the like or combinations thereof. In some embodiments, after a simulated manufactured device has been created by LPC, if the simulated device is not close enough in shape to satisfy design rules, OPC and/or MRC are be repeated to further refine IC design layout diagram 1022.

It should be understood that the above description of mask data preparation 1032 has been simplified for the purposes of clarity. In some embodiments, data preparation 1032 includes additional features such as a logic operation (LOP) to modify the IC design layout diagram 1022 according to manufacturing rules. Additionally, the processes applied to IC design layout diagram 1022 during data preparation 1032 may be executed in a variety of different orders.

After mask data preparation 1032 and during mask fabrication 1044, a mask 1045 or a group of masks 1045 are fabricated based on the modified IC design layout diagram 1022. In some embodiments, mask fabrication 1044 includes performing one or more lithographic exposures based on IC design layout diagram 1022. In some embodiments, an electron-beam (e-beam) or a mechanism of multiple e-beams is used to form a pattern on a mask (photomask or reticle) 1045 based on the modified IC design layout diagram 1022. Mask 1045 can be formed in various technologies. In some embodiments, mask 1045 is formed using binary technology. In some embodiments, a mask pattern includes opaque regions and transparent regions. A radiation beam, such as an ultraviolet (UV) beam, used to expose the image sensitive material layer (e.g., photoresist) which has been coated on a wafer, is blocked by the opaque region and transmits through the transparent regions. In one example, a binary mask version of mask 1045 includes a transparent substrate (e.g., fused quartz) and an opaque material (e.g., chromium) coated in the opaque regions of the binary mask. In another example, mask 1045 is formed using a phase shift technology. In a phase shift mask (PSM) version of mask 1045, various features in the pattern formed on the phase shift mask are configured to have proper phase difference to enhance the resolution and imaging quality. In various examples, the phase shift mask can be attenuated PSM or alternating PSM. The mask(s) generated by mask fabrication 1044 is used in a variety of processes. For example, such a mask(s) is used in an ion implantation process to form various doped regions in semiconductor wafer 1053, in an etching process to form various etching regions in semiconductor wafer 1053, and/or in other suitable processes.

IC fab 1050 includes wafer fabrication 1052. IC fab 1050 is an IC fabrication business that includes one or more manufacturing facilities for the fabrication of a variety of different IC products. In some embodiments, IC Fab 1050 is a semiconductor foundry. For example, there may be a manufacturing facility for the front end fabrication of a plurality of IC products (front-end-of-line (FEOL) fabrication), while a second manufacturing facility may provide the back end fabrication for the interconnection and packaging of the IC products (back-end-of-line (BEOL) fabrication), and a third manufacturing facility may provide other services for the foundry business.

IC fab 1050 uses mask(s) 1045 fabricated by mask house 1030 to fabricate IC device 1060. Thus, IC fab 1050 at least indirectly uses IC design layout diagram 1022 to fabricate IC device 1060. In some embodiments, semiconductor wafer 1053 is fabricated by IC fab 1050 using mask(s) 1045 to form IC device 1060. In some embodiments, the IC fabrication includes performing one or more lithographic exposures based at least indirectly on IC design layout diagram 1022. Semiconductor wafer 1053 includes a silicon substrate or other proper substrate having material layers formed thereon. Semiconductor wafer 1053 further includes one or more of various doped regions, dielectric features, multi-level interconnects, and the like (formed at subsequent manufacturing steps).

Details regarding an integrated circuit (IC) manufacturing system (e.g., system 1000 of FIG. 7), and an IC manufacturing flow associated therewith are found, e.g., in U.S. Pat. No. 9,256,709, granted Feb. 9, 2016, U.S. Pre-Grant Publication No. 20150278429, published Oct. 1, 2015, U.S. Pre-Grant Publication No. 20140040838, published Feb. 6, 2014, and U.S. Pat. No. 7,260,442, granted Aug. 21, 2007, the entireties of each of which are hereby incorporated by reference.

One aspect of this description relates to a method. The method includes conducting an electromigration (EM) check process on a schematic design, conducting a mitigating process to mitigate one or more electromigration violations identified during conducting the EM check process, and generating a layout design of the schematic design after at least one iteration of a design process including the EM check process and the mitigating process. The EM check process includes selecting at least some circuits in the schematic design as selected circuits for electromigration check, and checking electromigration compliance in the selected circuits. The mitigating process includes one of modifying some circuit layout of the selected circuits, modifying the schematic design, or modifying both the schematic design and some circuit layout of the selected circuits.

Another aspect of this description relates to a computer program code stored on a non-transitory computer-readable medium for generating a layout diagram of an integrated circuit. The computer program code is configured to cause a system having at least one processor to execute the following: performing a pre-layout circuit simulation of a schematic design, conducting an electromigration (EM) check process on a schematic design, conducting a mitigating process to mitigate one or more electromigration violations identified during conducting the EM check process, and generating a layout design of the schematic design after at least one iteration of a design process including the EM check process and the mitigating process. The EM check process includes selecting at least some circuits in the schematic design as selected circuits for electromigration check, and checking electromigration compliance in the selected circuits. The mitigating process includes one of modifying some circuit layout of the selected circuits, modifying the schematic design, or modifying both the schematic design and some circuit layout of the selected circuits.

Still another aspect of this description relates to a system for generating a layout diagram of an integrated circuit, in which the layout diagram is stored on a non-transitory computer-readable medium. The system includes at least one processor and at least one memory including computer program code for one or more programs. The at least one memory, the computer program code and the at least one processor are configured to cause the system to execute the following: performing a pre-layout circuit simulation of a schematic design, conducting an electromigration (EM) check process on a schematic design, conducting a mitigating process to mitigate one or more electromigration violations identified during conducting the EM check process, and generating a layout design of the schematic design after at least one iteration of a design process including the EM check process and the mitigating process. The EM check process includes selecting at least some circuits in the schematic design as selected circuits for electromigration check, and checking electromigration compliance in the selected circuits. The mitigating process includes one of modifying some circuit layout of the selected circuits, modifying the schematic design, or modifying both the schematic design and some circuit layout of the selected circuits.

It will be readily seen by one of ordinary skill in the art that one or more of the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

What is claimed is:

1. A method comprising:
   conducting an electromigration (EM) check process on a schematic design, wherein the EM check process includes,
      selecting at least some circuits in the schematic design as selected circuits for electromigration check,
      checking electromigration compliance in the selected circuits wherein the checking electromigration compliance in the selected circuits comprises obtaining a metal temperature in a metal segment in the selected circuits and obtaining the metal temperature in the metal segment in the selected circuits comprises:
         obtaining a metal temperature change in the metal segment; and
         selecting the metal temperature as being equal to a sum of an environment temperature and the metal temperature change in the metal segment;
   conducting a mitigating process to mitigate one or more electromigration violations identified during conducting the EM check process, wherein the mitigating process includes one of modifying some circuit layout of the selected circuits, modifying the schematic design, or modifying both the schematic design and some circuit layout of the selected circuits; and
   generating an initial layout design of the schematic design after at least one iteration of a design process including the EM check process and the mitigating process.

2. The method of claim 1, further comprising:
   performing one or more of design rule check, layout versus schematic verification, or parameter extraction on the initial layout design of the schematic design.

3. The method of claim 1, further comprising:
   performing a pre-layout circuit simulation of the schematic design before the generating the initial layout design of the schematic design.

4. The method of claim 1, further comprising:
   performing a post-layout circuit simulation the initial layout design of the schematic design after the generating a layout design of the schematic design.

5. The method of claim 4, further comprising:
   conducting a post-layout electromigration check on the initial layout design of the schematic design after performing the post-layout circuit simulation.

6. The method of claim 1, wherein the checking electromigration compliance in the selected circuits comprises:
   finding parameterized cells for some or all of the selected circuits, and
   obtaining layout geometries from the parameterized cells.

7. The method of claim 1, wherein the checking electromigration compliance in the selected circuits comprises:
   obtaining layout geometries from one or more layout constraint files.

8. The method of claim 1, wherein the checking electromigration compliance in the selected circuits comprises:
   identifying the one or more electromigration violations based upon metal layout geometries, via geometries, and metal temperatures.

9. The method of claim 1, wherein the checking electromigration compliance in the selected circuits comprises:
   identifying an electromigration violation in a metal segment in the selected circuits.

10. The method of claim 1, wherein the checking electromigration compliance in the selected circuits comprises:
    obtaining a metal current in a metal segment in the selected circuits from circuit simulation of the selected circuits in the schematic design.

11. The method of claim 1, wherein obtaining the metal temperature change in the metal segment comprise:
    determining temperatures of one or more relevant devices in the selected circuits.

12. The method of claim 1, wherein obtaining the metal temperature change in the metal segment comprise:
    determining temperatures of one or more relevant devices in the selected circuits based upon a self-heating effects thermal model.

13. The method of claim 1, wherein obtaining the metal temperature change in the metal segment comprise:
    determining temperatures of one or more relevant devices in the selected circuits from circuit simulation of the selected circuits in the schematic design.

14. The method of claim 13, further comprising:
    embedding a device temperature equation in a device model used in the circuit simulation of the selected circuits.

15. The method of claim 1, further comprising:
    performing a pre-layout circuit simulation of the schematic design before the generating the initial layout design of the schematic design; and
    wherein the pre-layout circuit simulation of the schematic design includes circuit simulation of the selected circuits.

16. A computer program code stored on a non-transitory computer-readable medium for generating a layout diagram of an integrated circuit, the computer program code is configured to cause a system having at least one processor to execute:
    performing a pre-layout circuit simulation of a schematic design;
    conducting an electromigration (EM) check process on the schematic design, wherein the EM check process includes,
       selecting at least some circuits in the schematic design as selected circuits for electromigration check,
    checking electromigration compliance in the selected circuits wherein the checking electromigration compliance in the selected circuits comprises obtaining a metal temperature in a metal segment in the selected circuits and obtaining the metal temperature in the metal segment in the selected circuits comprises:
       obtaining a metal temperature change in the metal segment; and
       selecting the metal temperature as being equal to a sum of an environment temperature and the metal temperature change in the metal segment;
    conducting a mitigating process to mitigate one or more electromigration violations identified during conducting the EM check process, wherein the mitigating process includes one of modifying some circuit layout of the selected circuits, modifying the schematic design, or modifying both the schematic design and some circuit layout of the selected circuits; and generating an initial layout design of the schematic design after at least one iteration of a design process including the EM check process and the mitigating process.

17. The computer program code of claim 16, wherein the computer program code is further configured to cause the system to:
perform one or more of design rule check, layout versus schematic verification, or parameter extraction on the initial layout design of the schematic design.

18. The computer program code of claim 16, wherein the computer program code is further configured to cause the system to:
perform a pre-layout circuit simulation of the schematic design before the generating the initial layout design of the schematic design.

19. A system for generating a layout diagram of an integrated circuit, the layout diagram being stored on a non-transitory computer-readable medium, the system comprising at least one processor and at least one memory including computer program code for one or more programs, and wherein the at least one memory, the computer program code and the at least one processor are configured to cause the system to execute:
performing a pre-layout circuit simulation of a schematic design;
conducting an electromigration (EM) check process on the schematic design, wherein the EM check process includes,
selecting at least some circuits in the schematic design as selected circuits for electromigration check,
checking electromigration compliance in the selected circuits wherein the checking electromigration compliance in the selected circuits comprises obtaining a metal temperature in a metal segment in the selected circuits and obtaining the metal temperature in the metal segment in the selected circuits comprises:
obtaining a metal temperature change in the metal segment; and
selecting the metal temperature as being equal to a sum of an environment temperature and the metal temperature change in the metal segment;
conducting a mitigating process to mitigate one or more electromigration violations identified during conducting the EM check process, wherein the mitigating process includes one of modifying some circuit layout of the selected circuits, modifying the schematic design, or modifying both the schematic design and some circuit layout of the selected circuits; and
generating the initial layout design of the schematic design after at least one iteration of a design process including the EM check process and the mitigating process.

20. The system of claim 19, wherein the computer program code is further configured to cause the system to:
perform one or more of design rule check, layout versus schematic verification, or parameter extraction on the initial layout design of the schematic design.

\* \* \* \* \*